(12) United States Patent
Mu et al.

(10) Patent No.: US 6,231,802 B1
(45) Date of Patent: May 15, 2001

(54) RAPID PROTOTYPING METHOD

(75) Inventors: Jien-Ping Mu, Chatham (CA); Zetian Wang, Sunnyvale, CA (US); Charles L. Thomas, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 09/462,053

(22) Filed: Jun. 12, 2000

Related U.S. Application Data
(60) Provisional application No. 60/051,477, filed on Jul. 1, 1997.

(51) Int. Cl.⁷ .............................. B29C 35/08; B29C 41/02
(52) U.S. Cl. .......................... 264/401; 264/482; 345/419; 378/4
(58) Field of Search .................................. 264/401, 482; 345/419; 378/4

(56) References Cited

U.S. PATENT DOCUMENTS
5,639,402 * 6/1997 Barlow et al. .................. 264/482 X

* cited by examiner

*Primary Examiner*—Leo B. Tentoni
(74) *Attorney, Agent, or Firm*—Trask Britt (57) ABSTRACT

A volume sequential technique allows the production of prototypes from a liquid photopolymer precursor without requiring the CAD model to be decomposed into slices. Inverse Tomographic Construction (ITC) selectively cures the photopolymer in a vat without requiring it translating build platform.

4 Claims, 13 Drawing Sheets

Fig. 5 a. Long UV curing setting

RAPID PROTOTYPING METHOD

This application is a 371 of PCT/US98/13715, filed Jul. 1, 1998 which claims the benefit of application Ser. No. 60/051,477, filed Jul. 1, 1997.

TECHNICAL FIELD

This invention relates to rapid prototyping technology. It is specifically directed to the production of prototypes from a liquid photopolymer.

BACKGROUND ART

The principles generally applicable to this invention are set forth in Bracewell, R. N. (1956). Strip Integration in Radio Astronomy, Aust. J. Phys. 9, pp. 198–217; Mu, J. P. (1997), Development of a Photopolymer Formulation and Cure Strategy for Inverse Tomographic Construction, Masters Thesis, University of Utah and Thomas C. L., Hayworth, K. (1996) Automating Sheet Based Fabrication, Solid Freeform Fabrication Symposium, Austin, Tex., USA, pp. 281–290. These references will assist those skilled in the art to understand and practice the invention.

Current rapid prototyping (RP) techniques provide important benefits to engineering and industry. These techniques have some practical limitations, however; specifically including construction speed and geometric error due to finite thickness layered construction.

RP techniques may conveniently be classified in terms of their basic construction strategies. While nearly all processes produce prototypes by sequential construction of 2D cross sections, the manner in which the layers are generated divides the many processes into natural classes:

1. Voxel Sequential Volume Addition
   Here the term voxel is defined as the smallest unit of volume that can be created by a given device. For stereolithography, this volume would be defined by the layer thickness, the beam width, and the smallest possible step in the scan direction. Voxel sequential processes generate solid geometry one voxel at a time, by scanning a laser line, driving an extruder head, or scanning a droplet deposition head. This concept is modified somewhat by droplet deposition devices with multiple deposition heads.
2. Area Sequential Volume Addition
   This class of processes generates each layer all at once. This class of processes includes Solid Ground Curing, which uses a photomask to cure a layer of photopolymer in a single step.
3. Periphery Cutting
   This class of devices are not purely additive devices. Here each layer is cut from a construction sheet and the layers are bonded together to create the prototype in an additive process. Laminated Object Manufacturing is a process belonging to this class.
4. Volume Sequential Volume Addition
   This class is for processes that operate on the entire construction volume at once to produce the prototype. No existing processes have been identified that fit within this class.

Using this classification scheme, a set of generic equations have been developed for use in comparing the build time required by devices from different classes for parts of varying geometry. (Thomas, 1996) From these equations, it can be concluded that voxel sequential processes are more efficient for thin walled structures, while a periphery cutting device might be preferred for heavy bodied models. Area sequential and volume sequential devices are conceptually independent of part geometry within the layer. While absolute build times depend on the physics of each process, by virtue of the reduced number of steps involved in the area sequential and volume sequential processes may be capable of increasing construction speed.

The layered approach to prototype construction results in a stepped appearance to part surfaces that are not vertical planes in the build direction. This shortcoming can be addressed by making the layers thinner, but the increased number of layers will adversely affect the build speed. While the volume sequential approach does not imply improved surface finish in each instance, a fundamentally different surface results from this process. The advantages and disadvantages of this new surface texture can be assessed once parts have been produced using the volume sequential approach.

DISCLOSURE OF INVENTION

A new volume sequential technique allows the production of prototypes from a liquid photopolymer precursor without requiring the CAD model to be decomposed into slices. Inverse Tomographic Construction (ITC) selectively cures the photopolymer in a vat without requiring a translating build platform. Where Stereolithography can be considered a voxel sequential construction process and Solid Ground Curing can be considered an area sequential construction process, ITC is a volume curing construction process. Due to this fundamental change, ITC has the potential to produce parts in minutes instead of hours or days.

BRIEF DESCRIPTION OF DRAWINGS

FIG. 3b illustrates a mathematically calculated X-ray of the screwdriver handle of FIG. 3a;

FIG. 5 is a graphical representation of the exposure energy received along a single line through the polymer vat during exposure through masks designed to construct the screwdriver handle of FIG. 3a;

BEST MODE FOR CARRYING OUT THE INVENTION

Figure 1:
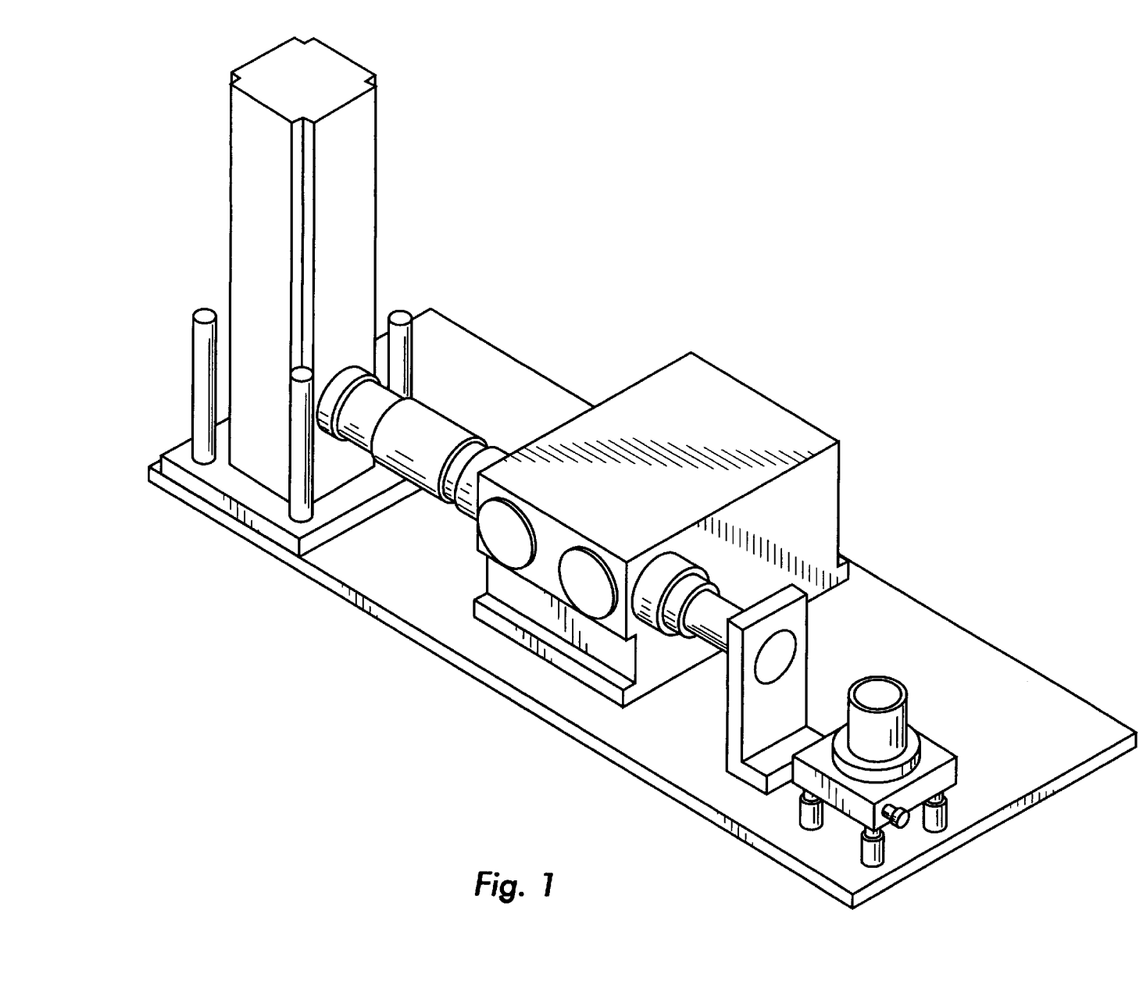
FIG. 1 is a schematic depiction of one embodiment of an Inverse Tomographic Construction Process of this invention.

ITC is a volume sequential construction technique. A conceptual schematic of the process is shown in FIG. 1. A vat of radiation curing polymer is exposed to curing radiation through a series of masks. In this example the radiation source is a xenon lamp. Light from the lamp passes through a monochromater to allow selection of the photon energy. Light from the monochromater passes through a photomask; and strikes the polymer. A series of masks are used, each mask representing the object from a different angle. The vat is exposed through each mask sequentially and the vat is rotated by an appropriate angle between exposures. An alternative approach would use a ring of lamps surrounding the vat and simultaneous exposure. The polymer receives a portion of the energy needed to reach a solid state from each exposure and the masks are designed to allow full cure only in the portions of the polymer in the vat that represent the desired object.

Figure 2:
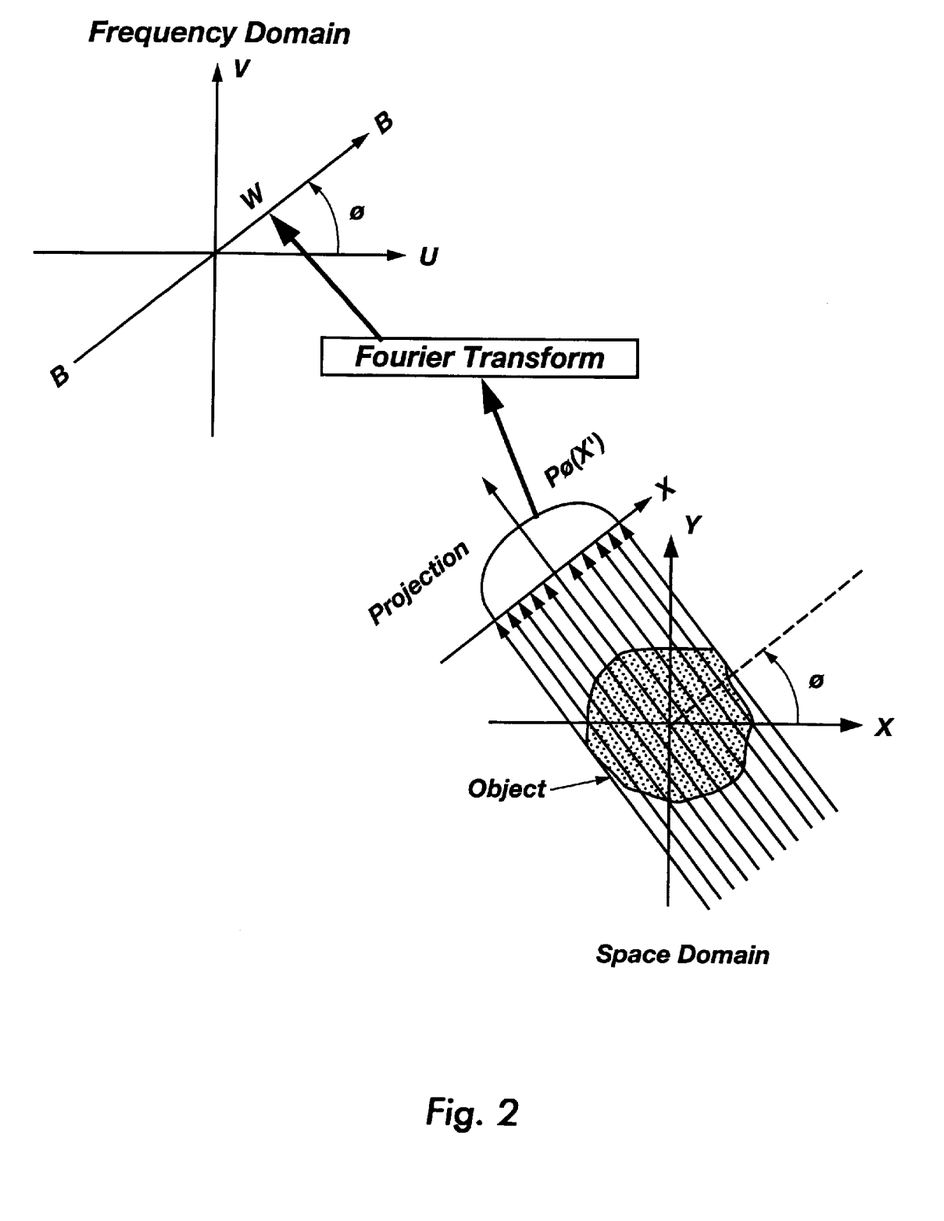
FIG. 2 is a diagrammatic illustration of one form Computed Tomography, based upon the principle that the Fourier transform of a single line of an X-ray is equivalent to the data from one polar line of a 2D Fourier transform of the slice corresponding to that X-ray line.

Computed Tomography can be performed using a variety of algorithms. The Fourier Slice Theorem (Bracewell, 1956) will be used as an example here. The Fourier Slice Theorem states that the values of a 2D Fourier Transform F(u,v) that lie on a vector a at an angle $\phi$ to the u axis can be found by taking a 1D Fourier Transform of the attenuation function, $P_\phi(x')$ produced from a parallel beam X-ray slice of an object taken at angle $\phi$. This is shown schematically in FIG. 2 and expressed mathematically as:

$$S_\phi(a) = \int_{-\infty}^{\infty} P_\phi(x')e^{-j2\pi ux'} dx'$$

where u=a cos($\phi$) and v=a sin($\phi$). F(u,v) is found by repeating this equation for all angles of $\phi$, then, the object cross section f(x,y) is found by performing the inverse transform of F(u,v).

Figure 3A:
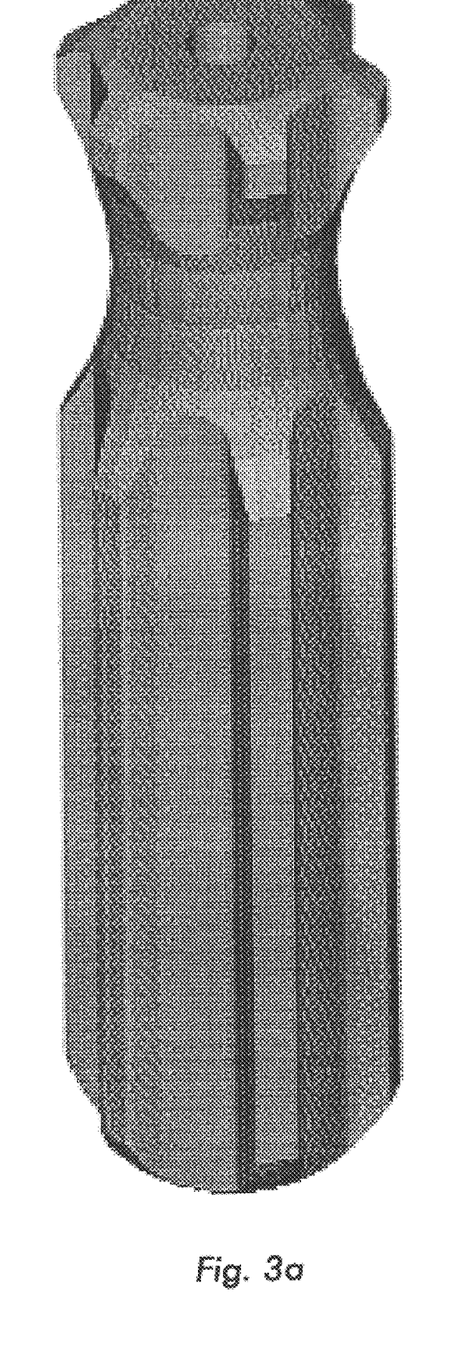
FIG. 3a illustrates a CAD solid model of a screwdriver handle.
Figure 3B:
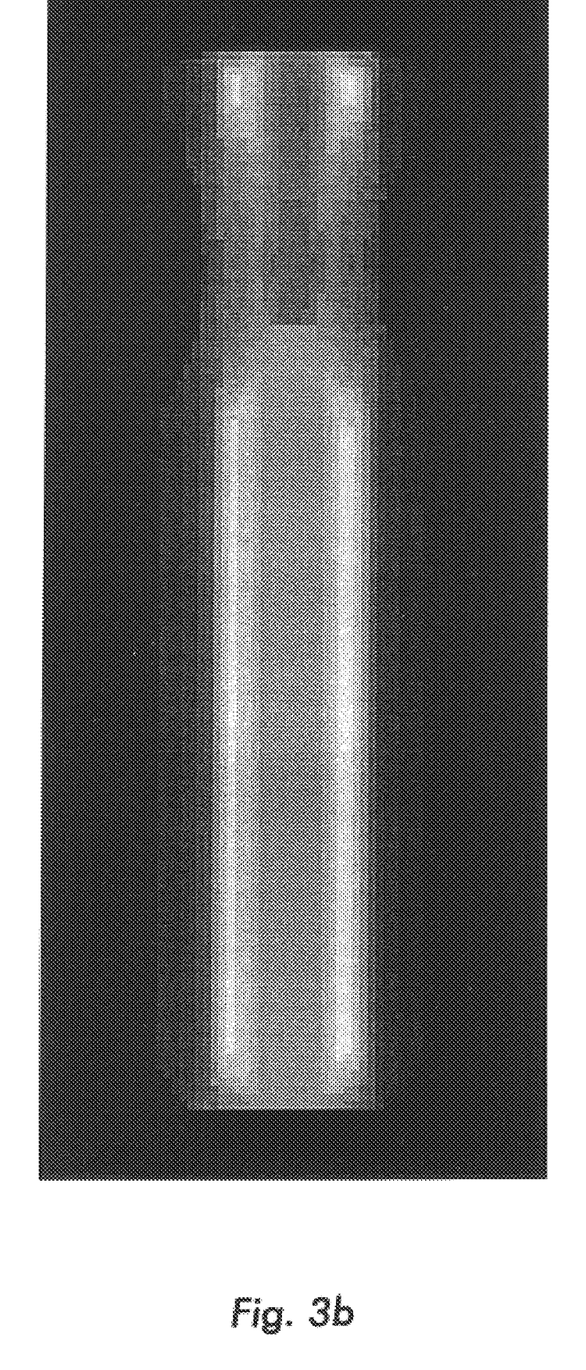

Inverse tomography is based on the assumption that an X-ray of the physical object, taken at a certain angle, will be a good approximation of the appropriate mask used to cure the polymer from that angle. Since the object geometry is known, the X-ray can be calculated mathematically. This is done by passing a vector through the object for each pixel position of the image and calculating the length of vector that resides inside the object. This length is proportional to the attenuation of the X-ray radiation that would be caused by the object mass:

$$A(x,y) \quad \bar{l}_i(x,y)$$

where A is attenuation and $l_i$ is the length along a vector passing through the object that is inside the object. For a given y, A(x) corresponds to P$\phi$(x') in Equation (1). A software that performs this algorithm on *.stl files was developed. The solid model of a screwdriver handle in FIG. 3(a) has been transformed into the X-ray/photomask shown in 3(b). For certain objects this technique will produce appropriate masks as will be demonstrated below. For other objects different techniques may be needed.

The name ITC results from the fact that this process is conceptually the inverse of the computed tomography techniques used to generate a 3D image of an object from a series of 2D X-rays taken at various angles. In CT a physical object is scanned and analyzed to generate a 3D model, while in ITC a 3D model is analyzed and the polymer vat is scanned to create a physical object.

EXAMPLE I

Modeling the Construction Process

Figure 4A:
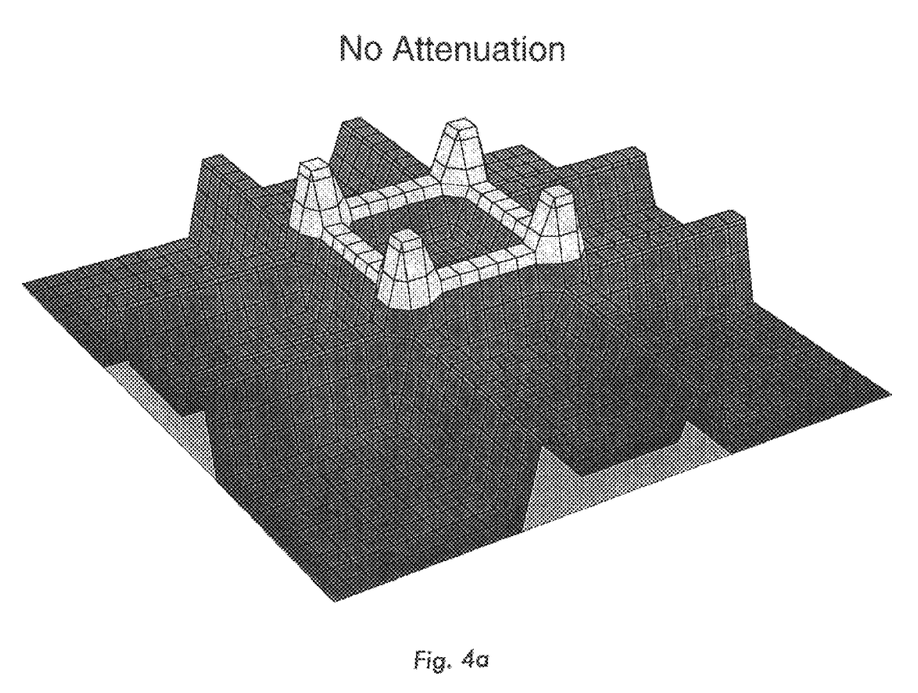
FIG. 4a is a diagrammatic illustration of a mathematical prediction of the cure distribution in a polymer vat, along a single cross section of the vat during the production of a hollow tube, after exposure through photomasks, assuming negligible light attenuation in the polymer.

To investigate the potential of the ITC mask generation technique without having to deal with the complications of polymer chemistry and optics, a forward model was constructed that predicts the state of cure that would result from a specific series of masks and exposure times. FIG. 4(a) is an example of a two step exposure at 90 degrees of a mask intended to create a hollow, square tube. The height of the raised sections of this figure represent the total exposure received by the polymer in a single 2D cross section of the polymer vat. The light color represents areas that have received total exposure above the threshold required to cause solidification.

Figure 4B:
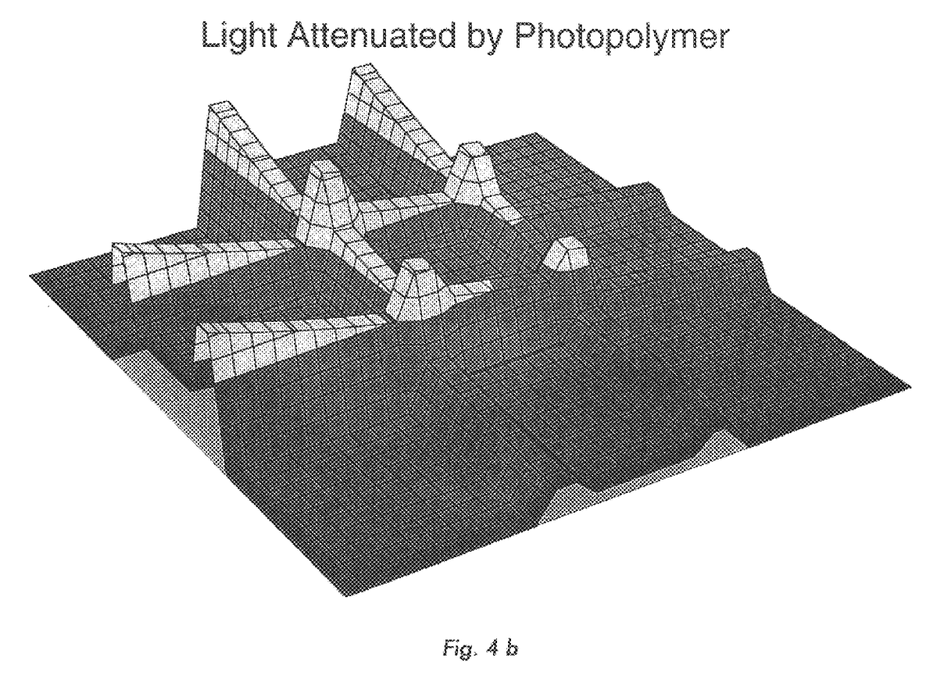
FIG. 4b is an illustration similar to FIG. 4a, assuming significant light attenuation in the polymer.

One of the problems associated with the physical implementation of this concept is that the polymer will absorb and attenuate the incident radiation, causing faster cure close to the radiation source and slower cure at the far side of the vat. FIG. 4(b) repeats the analysis in 4(a) for an attenuating polymer. Although the desired geometry has not yet formed, polymer has begun to solidify in other regions of the vat.

Figure 5:
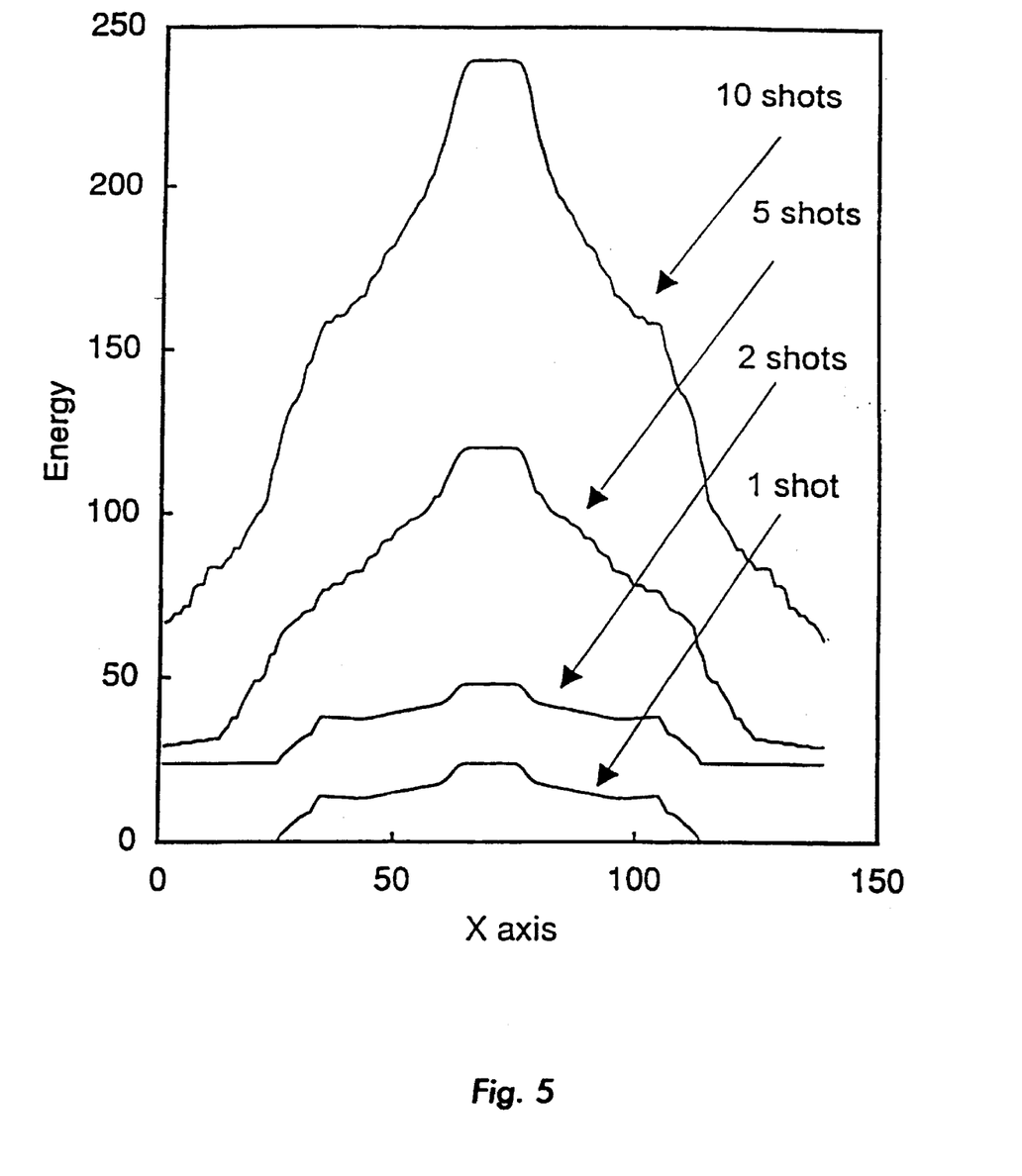

The angled edges on the exposure plots are not a result of the photomask, but simply a result of the program used to generate the plot. The edges in this example should be crisp and vertical. This will not be true for more complex geometries requiring more masks and more exposure angles. The edges will also be somewhat blurred by diffraction at sharp edges in the mask. FIG. 5 shows the calculated exposure profile for a series of exposures designed to build the screwdriver handle. As the number of exposures increases, the surface of the handle becomes less well defined.

EXAMPLE II

Implementation Experiments

Photopolymer systems formulated for use in current photopolymer based RP systems are not appropriate for ITC since they are designed for rapid cure and high attenuation allowing a thin solid layer to be rapidly formed on the surface of a pool of liquid polymer. ITC requires low attenuation, and at this stage of research rapid cure is not as important as controlled, predictable cure. To achieve these properties, a custom formulation has been investigated. (Mu, 1997)

Experimental Setup

Figure 6:
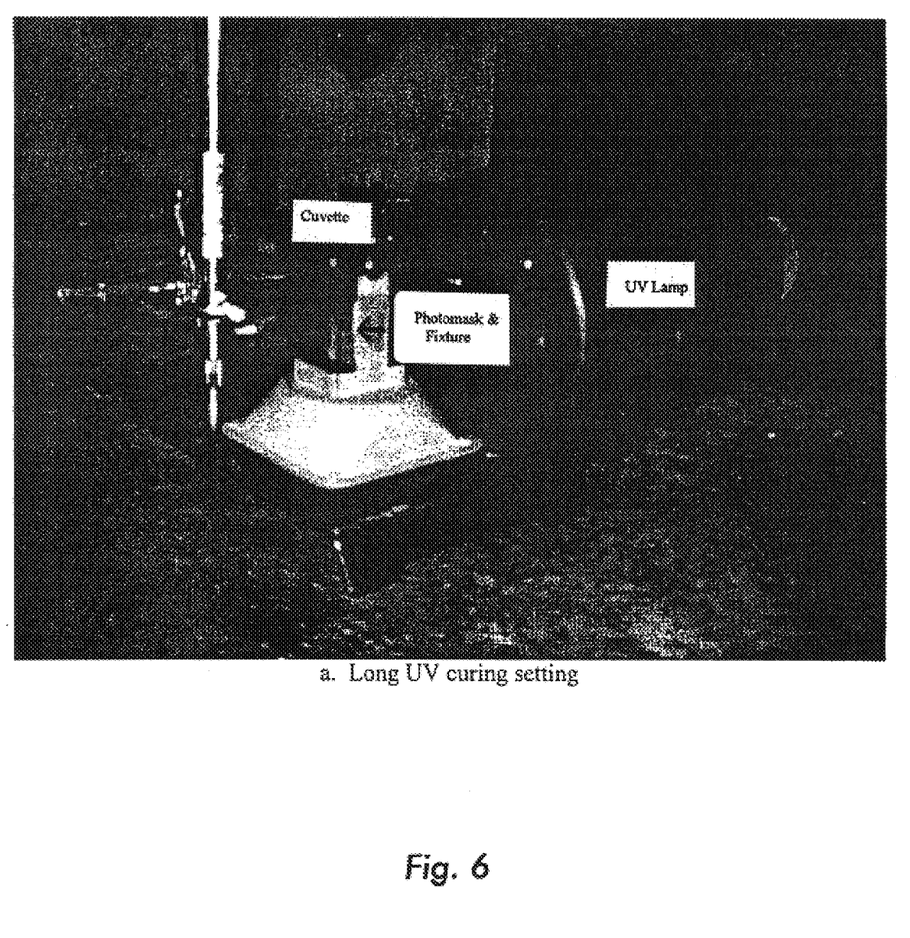
FIG. 6 is a photograph of an experimental setup.

An actual experimental setup to test the ITC paradigm is shown in FIG. 6. There are three major components needed for completion of the ITC photopolymerization process: a light source, photomasks, and the formulated polymer system. This experimental setup is for the purpose of verifying the ITC concept and photopolymer formulation.

As shown in FIG. 6, light from the source passes through a photomask that is essentially an opaque material with a hole. The photomask shields the light beam, only allowing light to reach the polymer through a circular hole The photomask is part of a square fixture that holds a quartz cuvette. Multiple exposures from different directions are accomplished by removing the cuvette, rotating it 90 degrees and replacing it in the fixture. After a few rotations, the polymer should solidify in the center of the cuvette producing a solid shape that has the form of the photomask.

The light sources used in this development were a long wave UV lamp with a peak wavelength of 365 rim and a xenon lamp. The long wave UV lamp has a light energy spectrum that is well matched to the designed polymerization wavelength for this process, but has relatively low energy output. The xenon lamp has higher energy output and the wavelength is tunable using a monochromater.

Polymer Formulation

Figure 7:
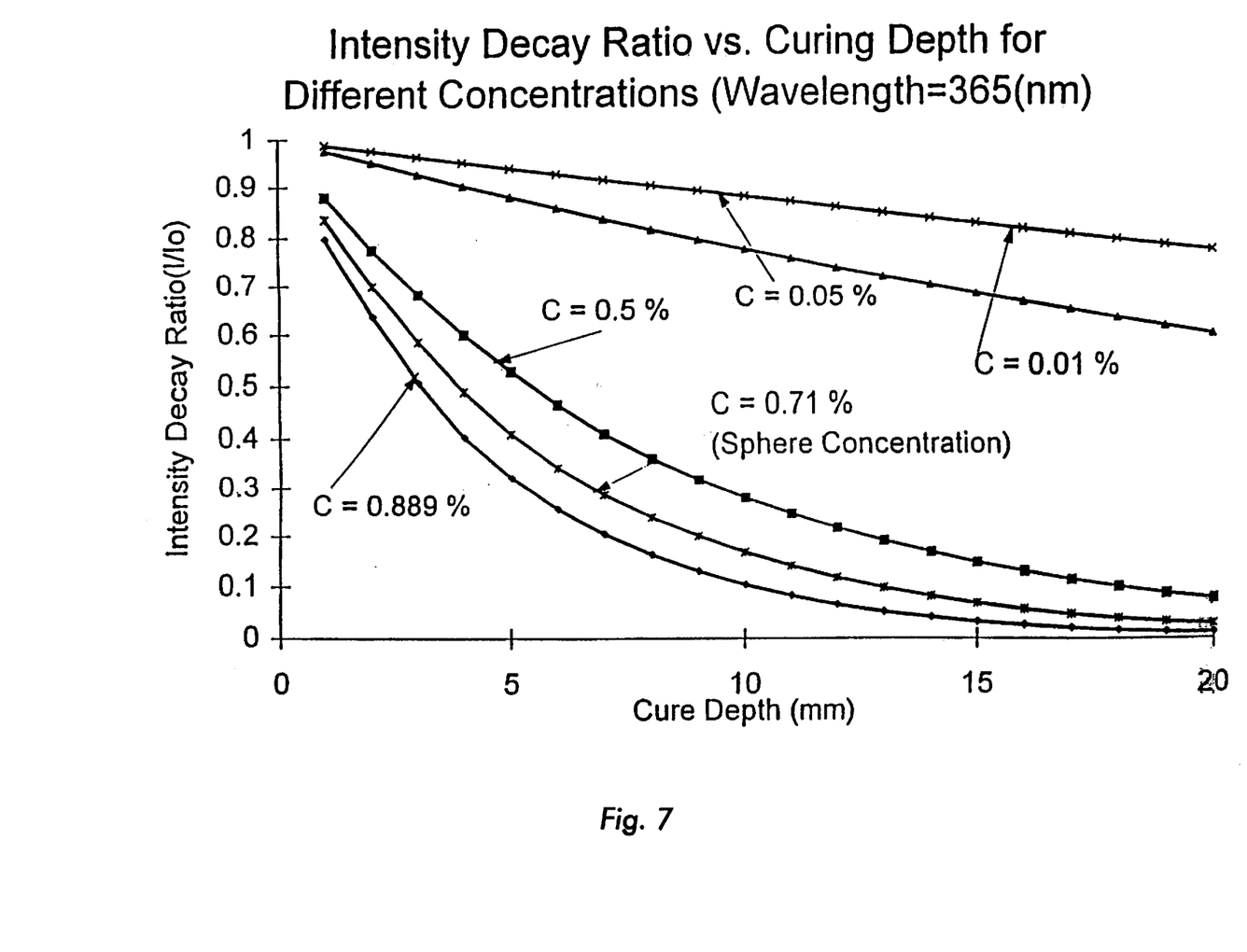
FIG. 7 is a plot of optical intensity decay vs. depth for the formulated polymer system with various photoinitiator concentrations.

The formulated polymer system used in this process is composed of several chemical compounds: monomer, oligomer and photoinitiator. The monomer and oligomer are the building blocks of the solid polymer while the photoinitiator serves the function of initiating polymerization. In order to minimize the attenuation of the light as it passes through the polymer, monomer and oligomer were selected that were transparent at the desired wavelength. It is not possible to select a photoinitiator that will not cause attenuation since the absorption of photons is the mechanism that initiates the polymerization. Thus, the system absorption properties can be controlled by adjusting the concentration of photoinitiator to obtain desirable system attenuation characteristics as well as acceptable solidification. Too much initiator causes light to get trapped at the surface of the vat. Too little initiator doesn't allow the polymer to solidify. There is an exponential relationship between cure depth and light energy governed by Beer's Law. FIG. 7 shows that as the photoinitiator concentration increases, the light absorption increases dramatically. A molar concentration of 0.71% is used for the current development.

Figure 8:
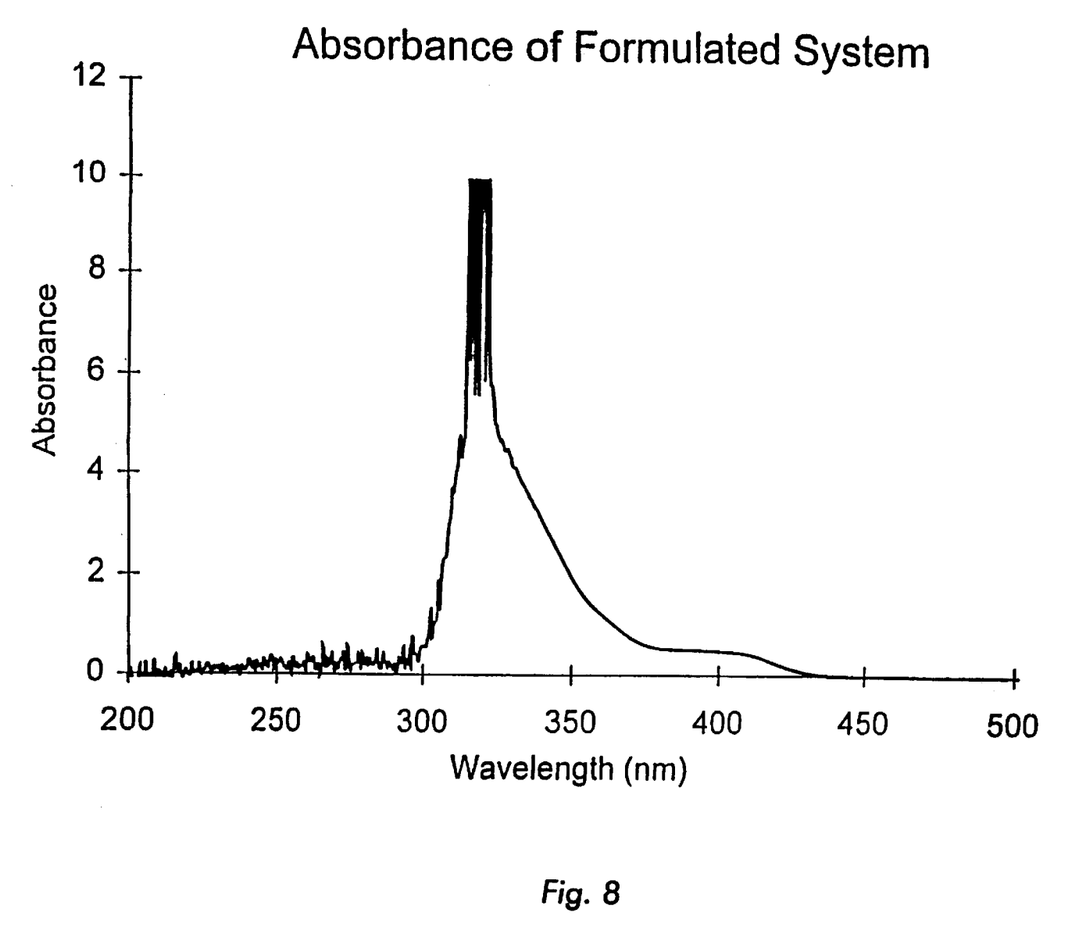
FIG. 8 is a graph of optical absorbance of the formulated polymer system as a function of wavelength.

FIG. 8 shows the absorption properties of the formulated system as a function of wavelength. The system has the highest absorption at 320 nm. However, this is not good for ITC because the light will not be able to get into the center of the polymeric system. At wavelengths above 400 rim the system absorption is very low. Here the light energy passes through the vat without interacting with the initiator and no solidification occurs. Thus, it is also possible to adjust the absorption of the polymer by changing the wavelength of the incident light. Polymerization in our research was carried out at a wavelength of 365 nm.

Solidification vs. Exposure

Figure 9:
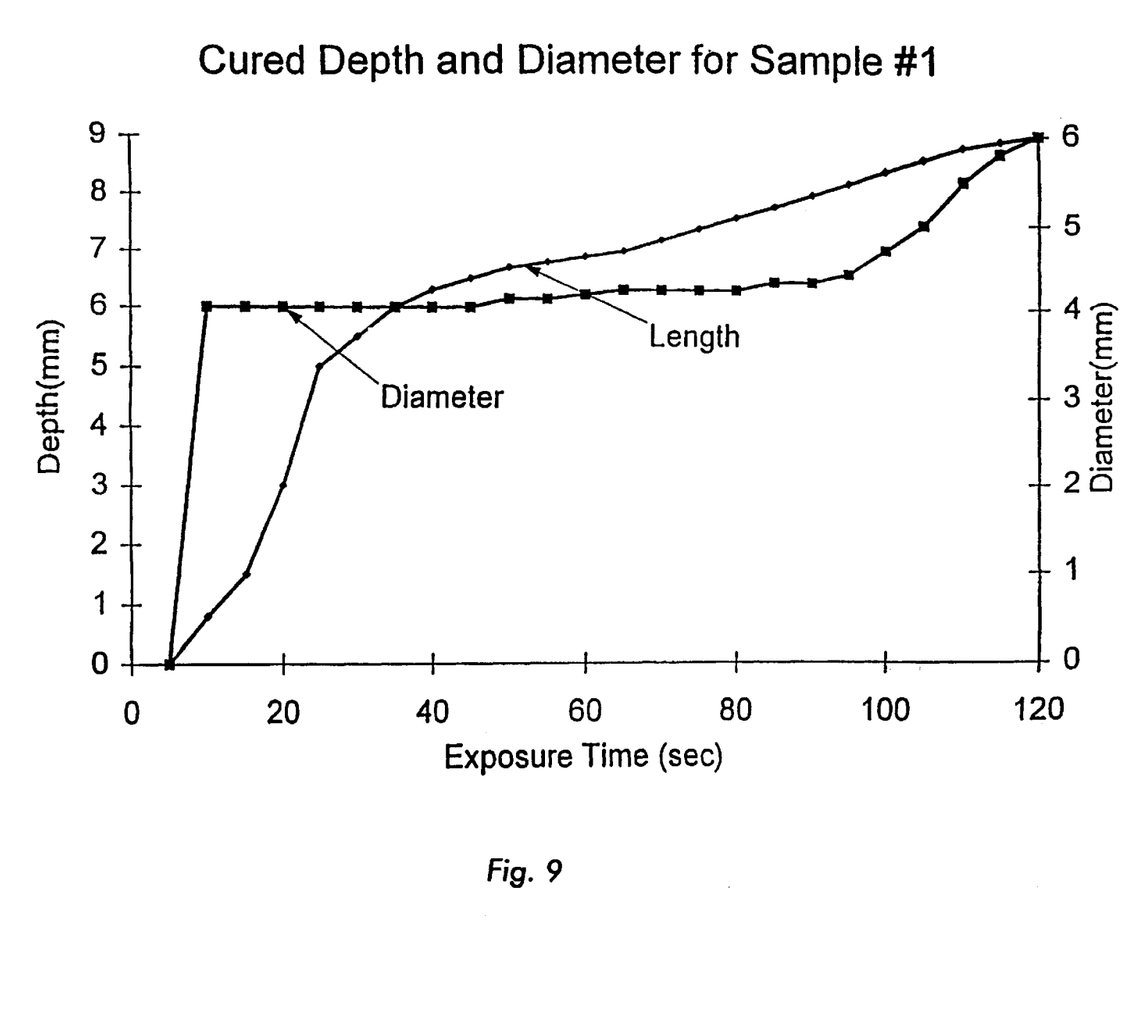
FIG. 9 is a plot of the changing length and diameter of cylinder being formed by exposure from one end.

If a simple experiment is performed where the polymer is continuously exposed from a single direction, a cylinder is formed. Solidification begins at the cuvette surface and extends into the interior. The changing diameter and length of this cylinder with time is shown in FIG. 9. This test gives a preliminary indication of the relationship between exposure and solidification.

Figure 10:
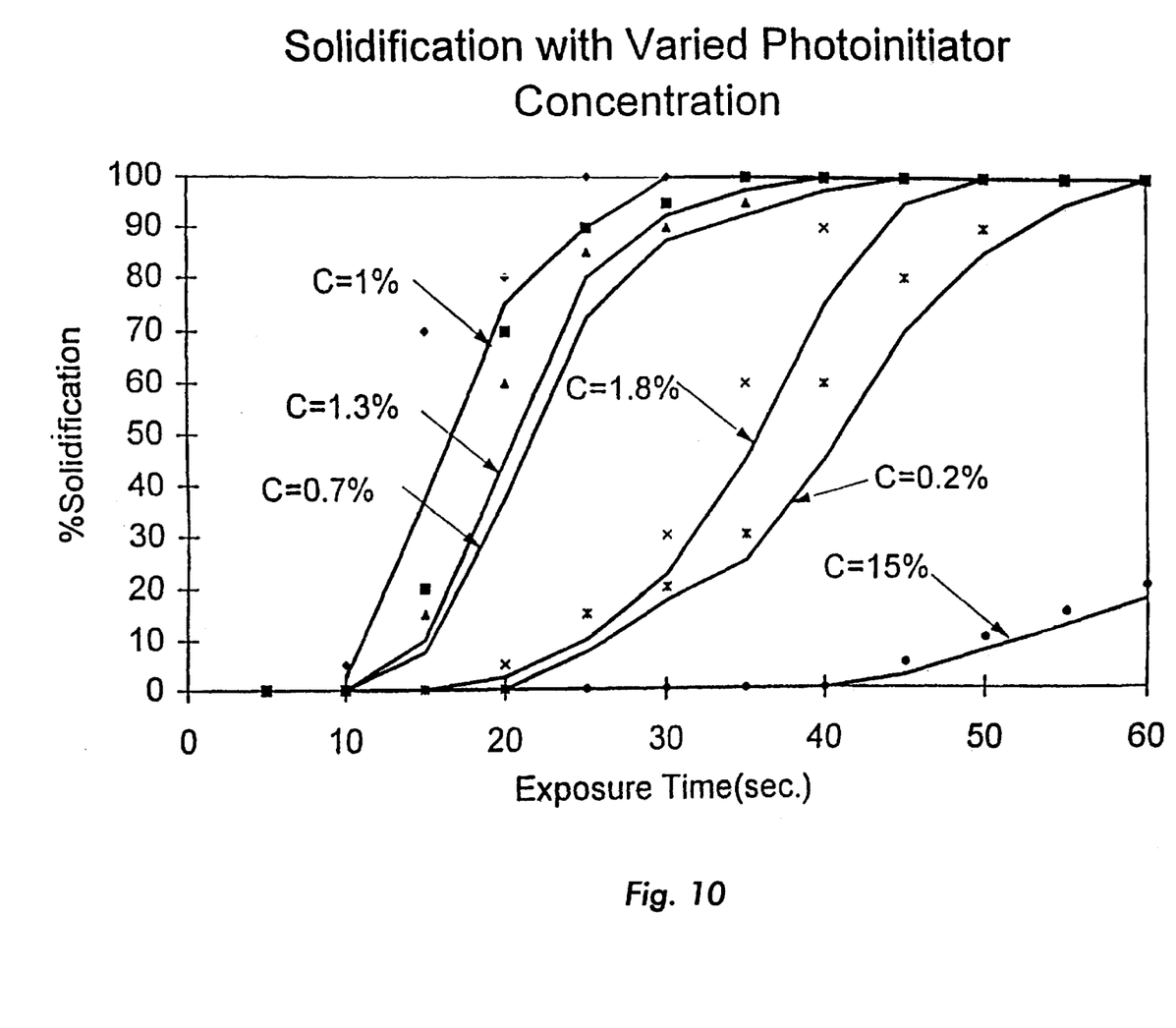
FIG. 10 is a graph showing the variation of solidification with exposure time for various concentrations of photoinitiator, solidification being determined using a qualitative scale.

A second set of experiments were performed where the polymer was exposed uniformly and a qualitative judgment of the solidification state was made as exposure progressed. The results of this second set of experiments are shown in FIG. 10. Various initiator concentrations were tested in an attempt to control the shape of the solidification vs. exposure curve.

EXAMPLE III

Producing an Object using ITC

Applying the information gained from the above experiments, a circular photomask was used with four exposure directions 90 degrees apart as a simple test of the potential for ITC. If it is possible to cure even an "ugly bean" in the center of the cuvette, then the volume curing principle has potential merit. The result of this experiment is the "ugly bean" on the left in FIG. 11. The "bean" only partially solidified under the exposure conditions and was somewhat soft when removed from the cuvette.

Figure 11:
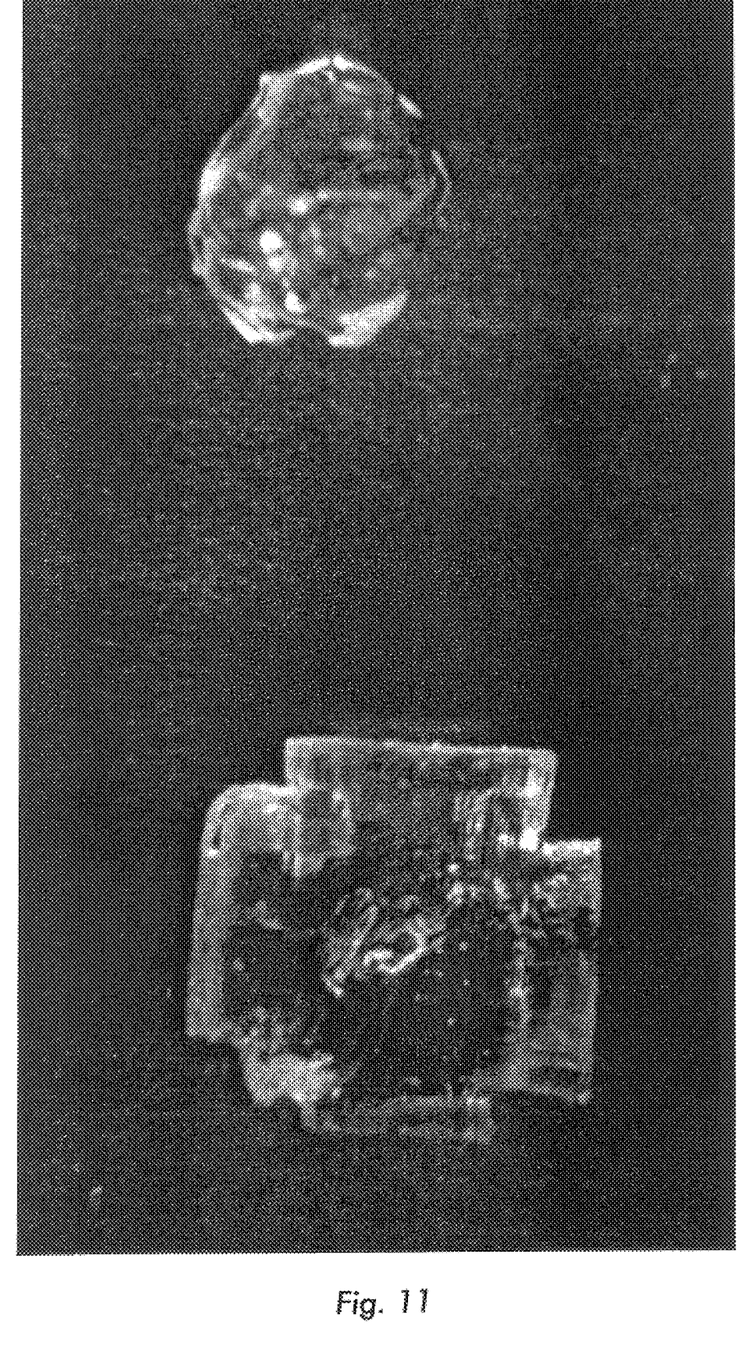
FIG. 11 is a photograph of the products of initial cure tests.

With this partial success, it was important to determine if there is potential to produce an accurate, defined surface in the center of the vat. To answer this question a rectangular mask was used in place of the circle and the exposure time was increased significantly. While the polymer solidified all the way to the cuvette wall, the goal of creating sharp defined surfaces was achieved. The cross shown on the right side of FIG. 11 is the result of this experiment. The irregularities that can be seen on the surface of this cross match the irregular edge of the photomask. The cross was quite rigid and solid after removal from the cuvene.

The Way in Which the Invention may be Exploited in Industry

The new RP process of this invention implements the volume sequential construction concept. Software may be utilized to generate the masks required by the process, and a predictive model may be constructed to demonstrate these masks. Formulation of a custom photopolymer system may be relied upon to produce a high viscosity liquid with low optical attenuation. Further work in the field will develop appropriate customized procedures to selectively cure the polymer in local regions of the polymer vat, whereby to produce crisply defined edges on the prototypes using this process.

What is claimed is:

1. A rapid prototyping method comprising the steps of:

providing a contained volume of radiation-curing polymer;

exposing said volume of polymer to curing radiation through a plurality of photomasks, each said photomask representing an object from a respective different angle;

said photomasks being constructed and arranged with respect to said volume of polymer such that said volume of polymer receives only a portion of the curing energy required to achieve solid state from each said photomask, and such that full cure is achieved only at regions within said volume of polymer which correspond to the configuration of said object.

2. A rapid prototyping method according to claim 1, wherein said volume of polymer is exposed through said photomasks in sequence, and said volume of polymer is rotated an angle corresponding to the perspective angle of respective said photomasks between corresponding respective said exposures.

3. A rapid prototyping method according to claim 1, wherein said plurality of photomasks are positioned around said volume of polymer, and said polymer is exposed to curing radiation through all of said photomasks simultaneously.

4. A rapid prototyping method according to claim 1 organized to implement the volume sequential construction technique, whereby a prototype is achieved through operation upon its entire construction volume during a single curing step.

* * * * *